Feb. 21, 1967             B. PHIELIX             3,305,586
PROCESS FOR PREPARING CYCLOHEXANONE
Filed Aug. 12, 1963
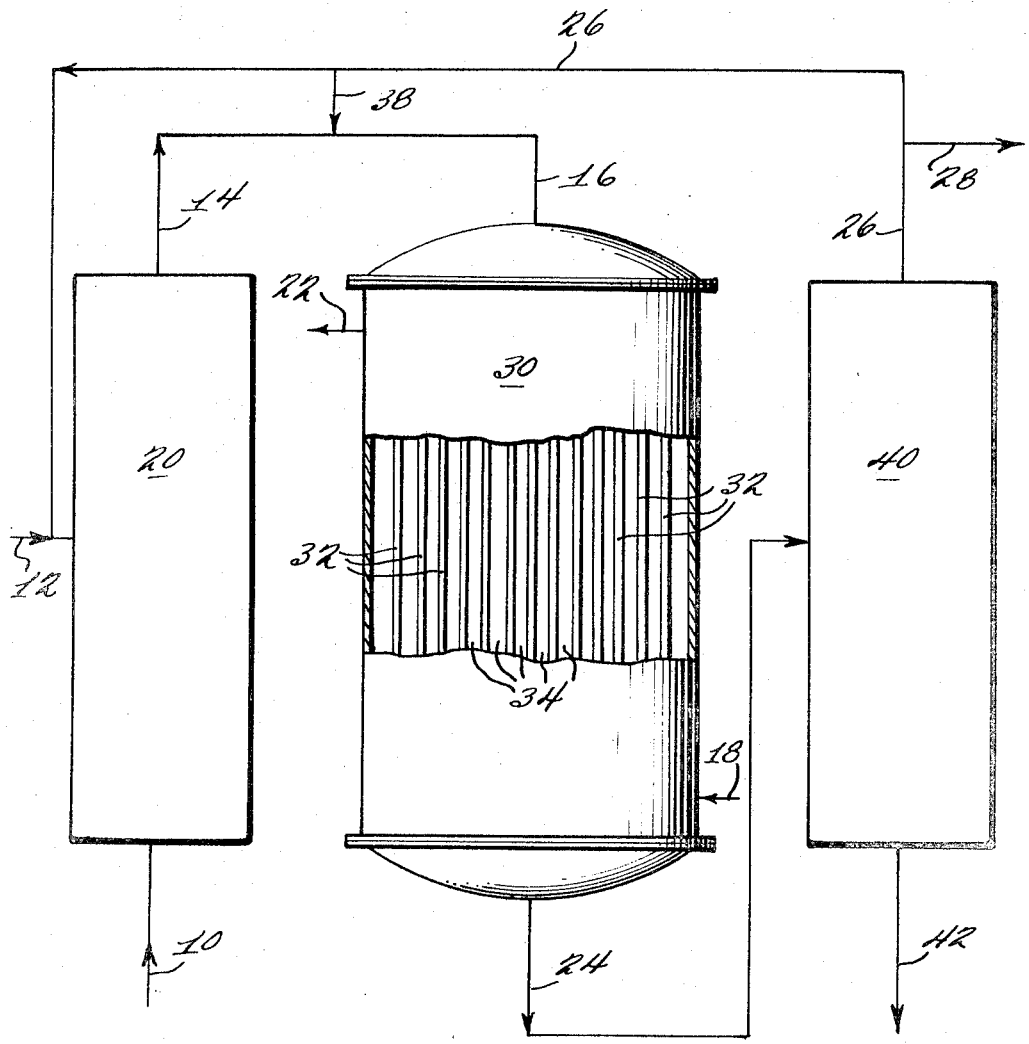
INVENTOR
BERNARD PHIELIX
BY Cushman, Darby & Cushman
ATTORNEYS United States Patent Office 3,305,586
Patented Feb. 21, 1967

3,305,586
PROCESS FOR PREPARING CYCLOHEXANONE
Bernard Phielix, Sittard, Netherlands, assignor to Stamicarbon N.V., Heerlen, Netherlands
Filed Aug. 12, 1963, Ser. No. 301,496
Claims priority, application Netherlands, May 15, 1959, 239,268
10 Claims. (Cl. 260—586)

This application is a continuation-in-part of my prior application, Serial No. 28,249, filed May 11, 1960, now abandoned.

This invention relates to a process for preparing cyclohexanone by contacting a mixture of phenolic vapors entrained in hydrogen gas in the presence of a palladium metal catalyst.

The efficient and economical synthesis of cyclohexanone from phenol has been a long-sought process. Because cyclohexanone is an intermediate hydrogenation product on the route from phenol to cyclohexanol, the first efforts involved a scheme in which phenol was hydrogenated to form cyclohexanol and the cyclohexanol was then subjected to catalytic dehydrogenation to form cyclohexanone. More recently, processes have been developed in which phenol in the liquid phase has been successfully selectively hydrogenated to cyclohexanone in the presence of hydrogen.

In these processes, two of which are described in United States Patents 2,829,166 and 2,857,432, the catalyst employed is a finely divided or colloidal palladium catalyst usually carried on an inert carrier or support, having from about 1% to 10% of palladium. This catalyst is dispersed with suitable agitation in liquid phenol and hydrogen gas in introduced into the liquid mass in a quantity sufficient to accomplish the desired hydrogenation.

In the process of United States Patent 2,829,166, this process was conducted with removal of portions of the liquid reaction mixture containing catalyst, phenol, and cyclohexanone. These portions were then treated for separation of the catalyst by filtration, and then, by distillation, of the cyclohexanone product from the reaction mixture. As United States Patent 2,857,432, by the same inventor, pointed out, however, the removal of portions of the reaction mixture with active catalysts therein, is a dangerous and expensive operation involving careful handling of a highly combustible and auto-inflammable catalytic material. During these operations, the catalyst must be always protected from air, to avoid fire, and this necessarily imposes complicated and expensive apparatus and cumbersome handling techniques.

In the process of Patent 2,857,432, an attempt to improve this process was provided whereby the cyclohexanone after being formed would be continuously removed from the liquid reaction mass in the stream of hydrogen bubbled therethrough as the reaction proceeded. This process, as related in the patent, had the virtue that it reduced the amount of filtration and handling of the hazardous catalyst mixture. However, as the hydrogenation reaction proceeds in the liquid mass, there is also continuous production of undesirable by-products known as "high boilers." As these high boilers byproducts build up in the feed, they will interfere with the process, and consequently more or less continuous purging of the liquid reaction mass remains necessary. This means that portions of the liquid reaction mixture must be withdrawn, including the portions of the catlyst suspended therein. This means, of course, as is explained in Patent 2,857,432, that additional quantities of fresh catalyst must be continuously introduced into the system.

Thus, while the process of Patent 2,857,432 constitutes an improvement over the process of Patent 2,859,166, both continue to exhibit and suffer from the disadvantages of a liquid reaction scheme, and both continue to require the undesired handling of the finely divided palladium catalyst in filtration and removal steps and both continue to be undesirably expensive processes.

Some idea of the expense of the process of 2,857,432, can be seen from its disclosure in which it is pointed out that the hydrogenator is a unit some 12 feet in diameter and 50 feet high containing as an initial charge some 2400 pounds of a 5% palladium catalyst on a charcoal support. This 5% catalyst requires constant replenishment after eight days of operation at the rate of some 120 pounds per day. Aside from the cost of the construction of such large unit, such large quantities of the catalyst metal add significantly to the cost of the process.

It is an object of this invention to provide a new and novel process which is free from the disadvantages of the prior art processes just described, and which accomplishes the production of cyclohexanone by hydrogenation of phenol in a much more economical way.

It is thus an object of the present invention to provide a process whereby phenol may be selectively hydrogenated to cyclohexanone in high yield, with the reaction carried out entirely in the vapor phase. A further object of this invention is to provide a process for the hydrogenation of phenol to cyclohexanone wherein filtration removal of catalyst from liquid reaction masses is not required, and the original catalyst charge may be used without replenishment for indefinitely long periods of time. Still a further object of this invention is to provide a process of the character described which may be practiced in relatively economical plants of small size and free from undue equipment complications.

Other objects of this invention will be apparent from the following description thereof and with reference to the drawing.

Broadly stated, the present invention represents an improvement in preparing cyclohexanone for treating phenol with hydrogen in the presence of a catalyst containing a metal belonging to the palladium group wherein the phenol is passed in the gaseous state, together with hydrogen, over the catalyst at a temperature below 250° C.

It is generally the practice of this invention to form a gas stream containing phenol and hydrogen either by passing hydrogen gas over solid phenol or over or through liquefied phenol. The preferred mode of operation is to feed the hydrogen-containing gas into a vessel containing a molten phenol and discharge therefrom the gaseous mixture containing phenol and hydrogen gas. Generally, this step is conducted at a temperature in the range of about 100 to 150° C. The evaporation of the phenol can also be carried out at higher temperatures, and above the boiling point of phenol, for example at a temperature in the range of 200 to 250° C. However, in this case, in order to avoid entraining of liquid particles in the gas stream, the gas must be passed through a filter, such as a coal filter, to remove the same. Such a coal filter can also be used to remove impurities from the gas.

It is not necessary that the gas used to evaporate the phenol be pure hydrogen gas, and in fact the use of the mixture of hydrogen gas with an inert gas is preferred. Suitable inert gases which may be used in this practice of the invention include nitrogen, argon, and the low molecular weight alkane hydrogenous gases such as propane.

The amount of inert gas present in the gas mixture may be varied over a wide range and may be for example, from about 10 to 75 volume percent of the hydrogen/inert gas mixture. In all cases, it is preferred to maintain the molecular ratio of hydogen to phenol higher than 1, for example in the range of from about 3:1 to about 25:1 or even higher. When the ratio is below 1:1, a high conversion rate of phenol to cyclohexanone cannot be expected.

After formation of the hydrogen (with or without inert gas) and final vapor gas stream, this stream will be maintained at a temperature sufficiently high to prevent any condensation of the phenol at the pressure employed. The temperature range is preferably from about 75 to 150° C., since at lower temperatures below 75° C., the conversion rate of phenol is low, whereas at higher temperatures e.g. above 250° C. the selectivity of the catalyst decreased. Thus, higher temperatures cause secondary reactions and therefore are avoided. Excellent results are obtained by use of the easily maintainable lower temperatures within the preferred range.

The phenol vapors, in this gas stream and at the said temperature, are then delivered at atmospheric pressure, or pressure thereabouts within the range of from about one to about five atmospheres, into the hydrogenation reactor. This hydrogenation reactor will be suitably equipped so as to distribute the gas stream in such fashion that it will pass over a fixed bed of the hydrogenation catalyst carried on its support.

As catalysts, the metals belonging to the palladium group, e.g., palladium, platinum, iridium, rhodium, ruthenium, and osmium may be used. These metals are supported on a carrier such as aluminum oxide, carbon, silica gel, and kieselgur, or the like.

In the practice of this invention wherein the hydrogenation reaction is conducted exclusively in the vapor phase, it has been found quite satisfactory to employ catalyst compositions in which the palladium metal is present in an amount substantially less than 1% of the carrier. For instance, the required amount of palladium metal is only from 0.1% to 0.8%, preferably about 0.4 to 0.6% of the carrier. In the prior art, hydrogenation techniques as disclosed in Patents 2,829,166 and 2,857,432, the amount of palladium metal on the catalyst support has always been considerably higher, above 1%, and generally in the range of about 5% by weight of the support.

The phenolic gas stream is then passed over the catalyst bed in the hydrogenation reactor at a temperature below 250° and as mentioned above preferably in the range of about 75 to 150° C., and it has been found the hydrogenation reaction takes place quite rapidly. The gas stream exiting from the hydrogenation reactor contains a high proportion of cyclohexanone, a small amount of unconverted phenol, and only quite small amounts of cyclohexanol, often even less than 1%. With careful selection of the reaction conditions, the gaseous reaction product can be prepared which contains hardly any phenol.

The gaseous reaction product may then be worked up in the usual fashion by condensing the condensable content, and removing the hydrogen product and then fractionally distilling the catalyst.

It will be understood that, in order to operate this process in a particularly successful fashion, the consumption of catalyst and its selective activity are of prime importance. Metals of the palladium group are quite expensive, particularly in the finely divided form distributed on a carrier. Metallic platinum today itself sells for about $80.00 an ounce. A process requiring the continuous handling and replenishment of the original catalyst charge, as is the case with the processes of Patents 2,829,166 and 2,857,432, is accordingly necessarily expensive.

Yet, it was the experience with those processes that this catalyst replenishment was necessary, particularly due to the physical handling of the liquid reaction product and the resulting partial removal and loss of the original catalyst charge, and also because of the loss of selectivity of the catalyst activity after a period of time in the liquid phase.

In the practice of the present invention, it has been found that no replenishment of the original catalyst charge is necessary, even when the process is operated continuously on an industrial scale for large plants. Moreover, it has been found that the selective activity of the catalyst is maintained, so that even after such operations over long periods of time the phenol reactant continues to be hydrogenated almost exclusively to cyclohexanone with only minimal production of cyclohexanol.

As a further discovery of this invention, it has been found that, when the phenolic hydrogenation to cyclohexanone is conducted as described in the vapor stage, the selective activity of the catalyst is improved and maintained during long periods of time when carrying out the hydrogenation in the presence of an inert gas in the hydrogen gas stream. The explanation for this peculiar result that the inert gas should enhance and assist in maintaining the selectivity of the hydrogenation catalyst is not presently known.

In order to further understand the nature of the present invention, reference may be had to the attached drawing, and the following example.

*Example 1*

In a continuous operation, molten phenol at a rate of 2000 kilograms (about 4400 pounds) per hour, are fed through pipe 10 into an evaporator vessel 20 at a temperature maintained in the range of 120–140° C. At the same time, a gas containing 85 volume percent of hydrogen and 15 volume percent of nitrogen is fed through pipe 12 into vessel 20 at a rate of 3060 cubic meters per hour (measured at 0° C. and one atmosphere). The gas containing entrained phenol vapor is then discharged from evaporator 20 through pipe 14, and carried overhead through pipe 16 into hydrogenation reactor 30.

Reactor 30 contains a large number of vertical pipes 32. A typical reactor for use in an operation of this size would be only about two meters (about 6½ feet) high, with a diameter of only about 1.5 meters (about 5 feet), and would contain about 2800 such vertical pipes 32. The gas entering the reactor through pipe 16 is distributed so as to flow through pipe 32, and a liquid heat exchange medium may be fed through pipe 18 so as to pass through a free space 34 between pipes 32. This liquid can be used to control the temperature, and is discharged from the reactor through pipe 22. The temperature in this reactor and the operation described is maintained in the range of between 130 and 155° C.

Altogether, the pipes 32 contain 2000 kilograms (about 4400 pounds) of a catalyst consisting of a mixture of 10 kilograms of finely divided palladium distributed on 1990 kilograms of aluminum oxide, as carrier, e.g. a catalyst containing 0.5% palladium. This solid catalyst rests upon a perforated bottom plate, not shown, arranged in each of the pipes 32.

The reaction products are discharged from reactor 30 through a pipe 24 and thence passed to a condenser 40, which is held at a temperature of about 30 to 40° C. From this condenser, the uncondensable gases are discharged through recirculation pipe 26 which leads back to inlet pipe 12. The recirculation pipe 26 is connected with a discharge pipe 28 for discharge of any undesirable portions of the gas. Pipe 38 provides a connection between recirculation pipe 36 and pipe 16 for controlling the amount of gas passed into reactor 30.

The reaction products are liquefied in condenser 40 and discharged therefrom through pipes 42 and led to a distillation system (not shown) for separation of the cyclohexanone by-product, unreacted phenol, and any high-boiling products.

The operation thus conducted according to this invention provides an hourly production of 1895 kilograms (4170 pounds) of cyclohexanone. The reaction product also contains 83 kilograms (about 183 pounds) of cyclohexanol; 100 kilograms (about 220 pounds) of unreacted phenol; and a small amount of only about 2 kilograms (about 4.4 pounds) of high-boiling products, mainly consisting of cyclohexylcyclohexanone. This amounts to an hourly weight production yield of almost 95%, and a weight conversion yield of over 99.5%. The molecular conversion yield is almost 96%.

This system has been operated continuously for a period well in excess of five months without the addition of any fresh or replenishment catalysts, without any recycling of catalyst and without any significant loss of selectivity of the catalyst itself, and can apparently be continued indefinitely. It can thus be seen that the present invention can be operated quite economically, with an economical physically relatively small plant utilizing as its major element a reactor unit of only a few feet in height and diameter. The system does not require complicated pumps and filters, and is not burdened by the cost of constantly replenishing the expensive catalyst, even aside from the elimination of the difficulties in handling this combustible material.

The following examples further illustrate the practice of the present invention, but clearly the same is not limited to the specific embodiments shown herein.

*Example 2*

A mixture of phenol vapor and hydrogen, containing 80 percent by volume of hydrogen, was passed over a catalyst comprising about 0.5% by weight of palladium on aluminum oxide, at a flow rate of 625 liters of said mixture (calculated at normal temperature and normal pressure) per liter of catalyst per hour. The catalyst bed was enclosed in a liquid bath kept at about 190° C. After condensation and removal of the hydrogen the condensed reaction product contained, in addition to phenol 63% by weight of cyclohexanone and less than 1% by weight of cyclohexanol.

*Example 3*

The process of Example 2 was repeated with a bath temperature of 225° C. and with a flow rate, as defined in Example 2, of 475 liters. The resulting condensed reaction product contained, in addition to phenol, 69% by weight of cyclohexanone and 1.7% by weight of cyclohexanol.

*Example 4*

The process of Example 2 was repeated with a hydrogen content of 95% by volume, a bath temperature of 140° C., and a flow rate, as defined in Example 2, of 1000 liters. This resulted in the formation of about 79% by weight of cyclohexanone, about 21% by weight of cyclohexanol, and about 0.1% by weight of phenol. Surprisingly, a very high, almost quantitative, conversion of phenol occurs at this relatively low temperature of 140° C.

*Example 5*

A gaseous mixture consisting of 4 vol.-percent phenol vapor, 72 vol.-percent nitrogen and 24 vol.-percent hydrogen is continuously passed at atmospheric pressure over a catalyst consisting of 0.5% by weight of palladium on aluminum oxide at a flow rate, as defined in Example 2, of 3200 liters. The catalyst is heated by means of a bath which is kept at about 100° C.

The issuing vapors are cooled and the condensed product obtained, which consists of 29% by weight of phenol, 70.5% by weight of cyclohexanone and 0.5% by weight of by-products, mainly cyclohexanol, is distilled.

This experiment is continuously carried out during 9 weeks.

*Example 6*

The experiment described in Example 5 is repeated with a gas-mixture consisting of 9% by volume of phenol vapor, 45% by volume of nitrogen and 46% by volume of hydrogen. The flow rate as defined in Example 2 is 1500 liters. The bath temperature is maintained at 140° C.

The condensed reaction product now consists of 29% by weight of phenol, 70% by weight of cyclohexanone and 1% by weight of by-products, mainly cyclohexanol.

This experiment is continuously carried out during 8 weeks.

It will be appreciated that various modifications may be made in the invention as described above without deviating from the scope thereof as set forth in the following claims wherein

I claim:
1. In the process for preparing cyclohexanone by selective catalytic hydrogenation of phenol, the improvement which consists essentially in (1) forming a gaseous mixture of hydrogen and phenol vapors having a molecular ratio of hydrogen to phenol in the range of from about 3:1 to about 25:1; (2) passing this mixture at a temperature from about 75° C. to about 250° C. and at a pressure from about 1 to 5 atmospheres while maintained in the vapor state through a reaction zone and over a fixed bed catalyst consisting essentially of a palladium metal supported on a carrier, said metal being present in a required amount of from about 0.1 to 0.8% of said carrier, whereby the phenol is hydrogenated in the vapor state to cyclohexanone; (3) removing the vapor reaction product from said reaction zone; and (4) thereafter condensing the vapor reaction product and separating cyclohexanone therefrom in high yield.

2. The process of claim 1 wherein said gaseous mixture is formed by passing a stream of hydrogen gas containing an inert gas in an amount from 10 to 75 volume percent of said hydrogen/inert gas mixture, over the phenol starting material.

3. The process of claim 2 wherein said inert gas is nitrogen.

4. The process of claim 2 wherein said phenol starting material is in the solid state.

5. The process of claim 2 wherein said phenol starting material is maintained in the molten state.

6. The process of claim 1 wherein said phenol vapor-containing gaseous mixture is formed at a temperature in the range of from about 75° to about 150° C.

7. The process of claim 1 wherein said reaction zone is maintained at a temperature in the range of about 75° to about 150° C.

8. The process of claim 7 wherein said temperature range is about between 130–155° C.

9. The process of claim 1 wherein said fixed bed catalyst consists essentially of 0.5% finely divided palladium metal supported on an aluminum oxide carrier.

10. In the process for preparing cyclohexanone by selective catalytic hydrogenation of phenol, the improvement which consists essentially in (1) forming a gaseous mixture of hydrogen and phenol vapors having a molecular ratio of hydrogen to phenol in the range of from about 3:1 to about 25:1 at a temperature in the range of from about 75° to about 150° C.; (2) passing this mixture at a temperature in the range of from about 75° to about 150° C. and at a pressure from about 1 to 5 atmospheres while maintained in the vapor state through a reaction zone and over a fixed bed catalyst consisting essentially of a palladium metal supported on a carrier, said metal being present in a required amount of from about 0.1 to 0.8% of said carrier, whereby the phenol is hydrogenated in the vapor state to cyclohexanone; (3) removing the vapor reaction product from said reaction zone; and (4) thereafter condensing the vapor reaction product and separating cyclohexanone therefrom in high yield.

References Cited by the Examiner

UNITED STATES PATENTS

| | | | |
|---|---|---|---|
| 2,328,719 | 9/1943 | Houghton et al. | 260—586 |
| 2,443,015 | 6/1948 | Whitaker et al. | 260—586 |
| 2,574,078 | 11/1951 | Whitaker et al. | 260—586 |
| 2,857,432 | 10/1958 | Joris | 260—586 |
| 3,076,810 | 2/1963 | Duggan et al. | 260—586 |

LEON ZITVER, *Primary Examiner.*

DANIEL D. HORWITZ, *Assistant Examiner.*